United States Patent
Yamaguchi et al.

[11] Patent Number: 5,962,401
[45] Date of Patent: Oct. 5, 1999

[54] DETERGENT BUILDER PROCESS OF MANUFACTURING SAME AND DETERGENT COMPOSITION CONTAINING SAME

[75] Inventors: Shigeru Yamaguchi; Yoshihiro Maeda, both of Himeji, Japan

[73] Assignee: Nippon Shokubai Co., Ltd., Osaka, Japan

[21] Appl. No.: 08/676,144

[22] PCT Filed: Dec. 15, 1995

[86] PCT No.: PCT/JP95/02576

§ 371 Date: Jul. 16, 1996

§ 102(e) Date: Jul. 16, 1996

[87] PCT Pub. No.: WO96/18714

PCT Pub. Date: Jun. 20, 1996

[30] Foreign Application Priority Data

Dec. 15, 1994 [JP] Japan ................................. 6-311500
Jan. 11, 1995 [JP] Japan ................................. 7-002738

[51] Int. Cl.$^6$ ................................. C11D 3/10; C11D 3/04
[52] U.S. Cl. ..................... 510/477; 510/434; 510/533; 510/410; 523/523
[58] Field of Search ................................. 510/477, 434, 510/533, 410; 523/523

[56] References Cited

U.S. PATENT DOCUMENTS

| | | | |
|---|---|---|---|
| 4,519,920 | 5/1985 | Fukumoto et al. | 210/701 |
| 4,659,793 | 4/1987 | Yang | 526/91 |
| 4,668,735 | 5/1987 | Fukumoto et al. | 524/804 |
| 4,797,223 | 1/1989 | Amick et al. | 526/211 |
| 5,064,563 | 11/1991 | Yamaguchi et al. | 252/174.23 |
| 5,175,361 | 12/1992 | Denzinger et al. | 562/590 |
| 5,574,004 | 11/1996 | Carr | 510/361 |

FOREIGN PATENT DOCUMENTS

| | | |
|---|---|---|
| 0 270 240 A2 | 6/1988 | European Pat. Off. . |
| 0 668 298 A1 | 8/1995 | European Pat. Off. . |
| 0 678 573 A1 | 10/1995 | European Pat. Off. . |
| 50-129500 | 10/1975 | Japan . |
| 56-53198 | 5/1981 | Japan . |
| 61-188497 | 8/1986 | Japan . |
| 63-137746 | 6/1988 | Japan . |
| 3-2167 B2 | 1/1991 | Japan . |
| 3-115314 | 5/1991 | Japan . |
| 3-168300 | 7/1991 | Japan . |
| 3-239800 | 10/1991 | Japan . |
| 6-2000 | 1/1994 | Japan . |
| 6-263434 | 9/1994 | Japan . |
| WO 91/14762 | 10/1991 | WIPO . |
| 95-03342 | 2/1995 | WIPO . |
| WO 96 02582 A1 | 2/1996 | WIPO . |

*Primary Examiner*—Richard L. Raymond
*Attorney, Agent, or Firm*—Kubovcik & Kubovcik

[57] ABSTRACT

A detergent builder is composed of a maleic acid copolymer having a weight-average molecular weight in a range of from 5,000 to 100,000, wherein a molar ratio of a maleic acid (salt) monomer to total monomers used in a process is in a range of from 0.1 to 0.9. The detergent builder is obtained by a copolymerization reaction of the monomers using a hydrogen peroxide and a persulfate as a polymerization initiator. As such detergent builder has high calcium ion stability constant and desirable property against iron particle deposition, it is suitably used as a detergent composition. The detergent builder may be prepared by granulation with agitation of powders containing the maleic acid copolymer as water-soluble polycarboxylic acid (salt) using a surface active agent. Such detergent builder has improved angle of repose, fluidity, and hygroscopicity, and the detergent builder having the described properties can be prepared by the dry-mixing process, thereby permitting the detergent composition having described excellent properties to be manufactured at low cost.

22 Claims, 1 Drawing Sheet

DETERGENT BUILDER PROCESS OF MANUFACTURING SAME AND DETERGENT COMPOSITION CONTAINING SAME

FIELD OF THE INVENTION

The present invention relates to a detergent builder which prevents a deterioration of detergency of a detergent composition and such detergent builder of a powdered form which shows an improved mixability to the detergent composition. The present invention also relates to a process of manufacturing the above-mentioned two types of detergent builders and detergent compositions respectively containing such detergent builders.

BACKGROUND OF THE INVENTION

Conventionally, it is known that maleic acid copolymers as a polymer of water-soluble polycarboxylic acid (salts) having many carboxylic groups show excellent functions of chelation and dispersion. For these beneficial properties, such copolymers have been used in a variety of fields, such as a detergent builder of a detergent composition, a dispersant, a flocculating agent, a scale formation inhibitor, a chelating agent, and a fiber processing agent and the like.

Among the described copolymers, those having many carboxylic groups in each molecule are suitably used for the above-mentioned respective uses. In the process of manufacturing such maleic acid copolymers, to overcome the deficiency that the polymerizability thereof is generally low, it has been proposed to increase the amount of the maleic acid component to be placed in a polymerization process to introduce many carboxylic groups. However, such method has the following drawbacks.

(1) A still long time is required for the polymerization process because of the low polymerizability of the maleic acid component;

(2) When the maleic acid component is placed at a higher proportion, a greater amount of hydrogen peroxide (polymerization initiator) is required;

(3) The use of the hydrogen peroxide in a large amount results in a high content of residual hydrogen peroxide from the polymerization reaction; and (4) In spite of the fact that the hydrogen peroxide (polymerization initiator) is used in a large amount, a content of residual unreacted maleic acid component is still high.

Furthermore, earnest researches have been made by the inventors of the present invention to find out important factors other than the content of the carboxylic acid of the maleic acid copolymer to improve the detergency of the detergent composition containing the maleic acid copolymer as a detergent builder.

As a result, the inventors of the present invention have found that it is important to improve the property of the maleic acid copolymer in its calcium ion stability constant, and the property against iron particle deposition for preventing clothes from being yellowish. Additionally, in the case of the maleic acid copolymers of high gelation properties, when using water of high hardness as water for washing, the detergency is significantly lowered as being undissolved. Thus, the inventors of the present invention have also found that it is necessary to lower the gelation properties.

As disclosed in the below-mentioned Gazettes, with the maleic acid copolymers produced under conventional reaction conditions, even if the hydrogen peroxide is used in a large amount as a polymerization initiator, it is difficult to effectively introduce the maleic acid component to a high molecular portion. Moreover, the problem of high content of residual unreacted maleic acid and hydrogen peroxide in the reaction solution upon the completion of the polymerization reaction has not been solved. Besides, the problem of high content of residual unreacted maleic acid and hydrogen peroxide remaining in the reaction solution upon completion of the polymerization reaction remains unsolved which results in low polymerizability.

The maleic acid copolymers isolated from the copolymerization reaction solution upon completion of the reaction have high concentration of hydrogen peroxide and a high content of the residual maleic acid, and maleic acid copolymers do not show desirable functions of chelation and dispersion. Therefore, such copolymers are not suited for the aforementioned purposes, and do not have sufficient levels of essential properties to improve the detergency of a detergent composition such as calcium ion stability constant, a property against iron particle deposition and a anti-gelation properties.

(1) Japanese Examined Publication No. 2167/1991 (Tokukohei 3-2167) discloses a process of manufacturing a maleic acid copolymer, wherein a maleic acid component is placed in a reaction vessel, and under the condition that the dropping of the maleic acid and the acrylic acid start and finish at the same time, a polymerization reaction of the maleic acid and acrylic acid is carried out at a pH in a range of from 3.5 to 5.0. The Gazette (1) discloses an example of using the maleic acid copolymer as a pigment dispersant. However, it fails to disclose the example of using an maleic acid copolymer as a detergent composition.

In the method of manufacturing the maleic acid copolymer of Gazette (1), a large amount of maleic acid in the reaction solvent remains unreacted upon completion of the reaction, and the hydrogen peroxide also remains unreacted in spite of the fact that a large amount of hydrogen peroxide water solution is used in the polymerization reaction. Additionally, the resulting maleic acid copolymer is inefficient in its calcium ion stability constant, property against iron particle deposition, anti-gelation properties, and the like.

(2) Japanese Laid-Open Patent Publication No. 218407/1987 (Tokukaisho 62-218407) discloses respective examples of using a maleic acid copolymers as a dispersant and a detergent composition. However, the detergent composition does not show an improved detergency from the generally used detergent composition, nor have desirably balanced properties for the detergent. The Gazette (2) discloses the process of preparing the maleic acid copolymer wherein a maleic acid component is placed in a reaction vessel, and under the condition that the dropping of the acrylic acid and hydrogen peroxide start and finish at the same time, a polymerization reaction is carried out at a pH of around 4–6, thereby obtaining a maleic acid copolymer.

In the method of manufacturing the maleic acid copolymer of Gazette (2), a large amount of maleic acid in the reaction solvent remains unreacted upon completion of the reaction in spite of the fact that a large amount of hydrogen peroxide is used in the polymerization process, and a large amount of hydrogen peroxide also remains unreacted. Besides, the resulting maleic acid copolymer is inefficient in its calcium ion stability constant, property against iron particle deposition property, anti-gelation properties, and the like.

(3) Japanese Examined Patent Publication No. 14046/1991 (Tokukohei 3-14046) discloses a copolymer of ethylenically unsaturated monomer and dicarboxylic acid. The Gazette (3) discloses an example of using such copolymer as a skin formation inhibitor with respect to the detergent but fails to disclose a concrete example of using such copolymer.

As in the case of the aforementioned Gazettes, the Gazette (3) discloses the process wherein the ethylenically unsaturated dicarboxylic acid component is placed in a reaction vessel, and a polymerization reaction is carried out under the condition that the dropping of the ethylenically unsaturated monocarboxylic acid and the hydrogen peroxide water solution start and finish at the same time. However, the resulting maleic acid copolymer is insufficient in its calcium ion stability constant, property against iron particle deposition, anti-gelation property, and the like.

As described, the maleic acid copolymers resulting from the conventional reaction process are inferior in essential properties for various uses especially as the detergent composition. In addition, it is difficult to remove the maleic acid and hydrogen peroxide remaining in the resulting maleic acid copolymer from the conventional reaction. Besides, when using the maleic acid copolymer having a large amount of the residual maleic acid as a detergent composition, chelating and dispersing functions are adversely affected, and the detergency is lowered. Furthermore, when using the maleic acid copolymer having a high content of residual hydrogen peroxide as a detergent composition, the problem of unsafety arises as it may adhere to a skin of the user.

In the case of using the above-mentioned conventional copolymer, for example, as a detergent builder for a detergent composition, it is preferable to use it in a powdered form rather than liquid form as it is less restricted in its density and mixing ratio. Besides, if the final product is in the powdered form, a cost required for the drying process of the product can be reduced.

However, such copolymer of a powdered form has the problem of uneasy handling due to its extremely high hygroscopicity and very poor fluidity, etc. Therefore, most copolymers available in the market are in liquid form rather than the powdered form.

The powdered detergent as the detergent composition is mainly available as a low density product resulting from the conventional spray-drying process. However, for convenience in view of transportation, carriage and storage place, etc., of the detergent, there is a tendency of using a compact powdered detergent of higher density.

The density can be increased, for example, in such a manner that a raw material is first formed into powders by the spray-drying process, and then formed into a granule by an agitated granulator such as a mixer as disclosed by (4) Japanese Laid-Open Patent Publication No. 2000/1994 (Tokukaihei 6-2000). For each step in the above-mentioned method, as at least one kind of liquid raw material is required, many processes of mixing, drying, granulating, drying, classification, etc., are required for each step.

On the other hand, when all the materials are in the powdered form, the detergent composition can be prepared only by the dry-mixing process, and the multiple-steps of mixing, drying, granulating, drying, classifying, and the like required in the Gazette (4) can be omitted. Namely, as the density can be increased by carrying out only one step of mixing, a significant cost reduction can be achieved.

However, the maleic acid copolymer used as one component of the detergent builder as one of the detergent composition has a problem of uneasy handling due to hygroscopicity when using it in the powdered form as previously described. Therefore, in practice, it is difficult to increase the density by applying the dry-mixing process to the detergent composition containing the copolymer.

In addition, when applying the dry-mixing process to a powder of each detergent composition, it is required to structure such that respective compositions have the same bulk density in consideration of the problem of segregation after mixing the powder. When applying the dry-mixing process to each composition of the powdered form, the fluidity of each powder is extremely important. Besides, in the mixing process, it is necessary to have low hygroscopicity of each powder to prevent it from adhering to a line, a hopper, and the like, and the bulk density thereof has to be set as close as that of the detergent composition.

However, as the copolymer has a desirable solubility to the washing water, it is difficult to satisfy the bulk density, fluidity and hygroscopicity sufficient for the dry-mixing process in the form of powder.

DISCLOSURE OF THE INVENTION

[Object of the Invention]

The object of the present invention is to provide a detergent builder containing a copolymer of maleic acid having a high calcium ion stability constant and a desirable property against iron particle deposition. The second object of the present invention is to provide a method of manufacturing the copolymer of maleic acid and a detergent composition containing the detergent builder.

The third object of the present invention is to provide a detergent builder containing a copolymer of polycarboxylic acid (salts) such as a copolymer of maleic acid, etc., having improved hygroscopicity and fluidity and high bulk density, and to provide a method of manufacturing the detergent builder, and also to provide a detergent composition containing such detergent builder.

[Summary of the Invention]

Earnest researches have been made by inventors of the present invention to achieve the first object of the present invention, and they have succeeded in achieving the present invention by focusing the researches on the calcium ion stability constant and property against iron particle deposition.

Namely, the detergent builder of the present invention is characterized by being composed of a maleic acid copolymer having a weight-average molecular weight in the range of from 5,000 to 100,000, wherein a molar ratio of maleic acid monomer to a total monomers used in the process is in the range of from 0.1 to 0.9.

For the maleic acid copolymer of the present invention, any copolymer obtained by the polymerization reaction with monomers including a maleic acid (salt) as a monomer component is used. Other than the maleic acid (salt), a water-soluble ethylenically unsaturated monomer is preferable for the other monomer.

Examples of the water-soluble ethylenically unsaturated monomer include: an unsaturated monocarboxylic acid monomer such as acrylic acid, methacrylic acid, 60-hydroxy acrylic acid, crotonic acid, and the like, and salts thereof; unsaturated polycarboxylic acid monomer such as fumaric acid, itaconic acid, citraconic acid, aconitic acid, and salts thereof; vinyl acetate, and the like.

The water-soluble ethylenically unsaturated monomer may be a compound of formula (1)

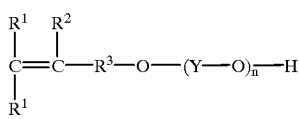

(1)

(in the formula, $R^1$ and $R^2$ independently represent a hydrogen atom or a methyl group but are not both methyl group, $R^3$ represents a —CH$_2$—, —(CH$_2$)$_2$—, or —C(CH$_3$)$_2$— group and the total number of the carbon atoms in $R^1$, $R^2$ and $R^3$ groups is 3, Y represents an alkylene group of carbon number 2 to 3, and n is 0 or an integer of 1 to 100).

Examples of such water-soluble ethylenically unsaturated monomer include: a monomer containing unsaturated hydroxy group such as 3-methyl-3-butene-1ol (isoprenol), 3-methyl-2-butene-1-ol(prenol), 2-methyl-3-butene-2-ol (isoplene alcohol), and monomers of 1 mole of 3-methyl-3-butene-1-ol(isoprenol), 3-methyl-2-butene-1-ol(prenol), 2-methyl-3-butene-2-ol(isoplene alcohol) to which respectively 1–100 mole of ethylene oxide and/or propylene oxide is added.

The water-soluble ethylenically unsaturated monomer may be a compound of formula (2)

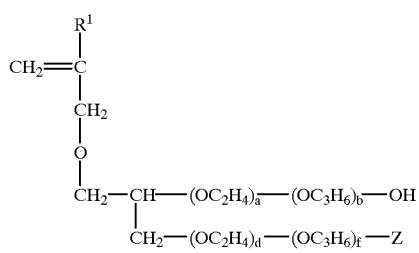

(2)

(in the formula, $R^1$ represents a hydrogen atom or a methyl group, a, b, d, and f independently represent 0 or a positive integer of 1 to 100 and the total number of a, b, d, and f is 0 to 100, the (OC$_2$H$_4$)— and —(OC$_3$H$_6$)— units may be combined in any order, Z represents a hydroxyl, sulfonic acid, or phosphoric (or phosphorous) acid group when the sum of d and f is 0, and Z represents a hydroxyl group when the sum is a positive integer of 1 to 100).

Examples of such water-soluble ethylenically unsaturated monomer include: 3-ariroxy-2-hydroxypropane sulfonic acid and salts thereof; unsaturated (meth)allyl ether monomers such as glycerol monoallyl ether monomers, and 1 mole of glycerol monoallyl ether monomers to which 1–100 mole of ethylene oxide and/or propyleneoxide is added; a monomer containing an unsaturated sulfonic acid group such as vinyl sulfonic acid, allyl sulfonic acid, methasulfonic acid, styrene sulfonic acid, 2-acrylamide-2-methylpropane sulfonic acid, sulfoethyl(meth)acrylate, sulfopropy 1(meth)acrylate, 2-hydroxysulfopropyl (meth) acrylate, sulfoethyl maleimide, and salts thereof; an unsaturated ester monomer containing a terminal end alkyl group such as a monoester of alcohol having 0–100 mole of ethylene oxide and/or propylene oxide added to alkyl alcohol of 1–20 carbon atoms and (meth)acrylic acid, crotonic acid, etc., or maleic acid, fumaric acid, itaconic acid, citraconic acid, aconitic acid, etc., or salts thereof; or diester thereof; a monoester monomer having 1–100 mole of ethylene oxide and/or propylene oxide added to 1 mole of unsaturated carboxylic acid monomer such as (meth)acrylic acid, crotonic acid, etc., or a monoester having 1–100 mole of ethylene oxide and/or propylene oxide added to an unsaturated carboxylic acid monomer such as maleic acid, fumaric acid, itaconic acid, citraconic acid, aconitic acid, or salts thereof; or ester unsaturated monomer such as diester monomer, and the like. Only one kind of the above-listed monomer may be adopted, or two or more kinds thereof may be suitably mixed and adopted. Among all monomers listed above, (meth)acrylic acid (salts) is the most preferable water-soluble ethylenically unsaturated monomer.

The method of preparing the maleic acid copolymer contained in the detergent composition of the present invention is not specifically limited. However, the maleic acid copolymer (to be described later) is preferably obtained by carrying out a copolymerization of a maleic acid (salts) and water-soluble ethylenically unsaturated monomer in an aqueous medium using hydrogen peroxide as a water-soluble polymerization initiator.

The maleic acid copolymer of the present invention is preferably obtained by carrying out an aqueous solution copolymerization reaction of maleic acid (salt) (A) and a water-soluble ethylenically unsaturated monomer (B) using persulfate and hydrogen peroxide as a water-soluble polymerization initiator.

It is especially preferable to employ a maleic acid copolymer obtained by carrying out a solution copolymerization reaction in such a manner that a concentration of hydrogen peroxide upon completion of the polymerization reaction is not more than 0.05 percent by weight with respect to the total amount of the reaction solution, and by isolating the copolymer from the copolymerization reaction solution having not more than 3 percent by weight of residual maleic acid with respect to the total amount of reacted product under conditions of a) through e) to be described later.

The maleic acid (salts) used in preparing the maleic acid copolymer of the present invention may be introduced into the reaction vessel in any form of maleic acid, maleic acid monoalkali metal salts, and maleic acid dialkali metal salts. Only one kind of the above-listed material may be adopted, or two or more kinds thereof may be suitably mixed and adopted. The maleic acid may be obtained by hydrolyzing a maleic acid anhydride in a reaction vessel. The maleic acid monoalkali metal salts, maleic acid dialkali metal salt may be obtained by reacting a maleic acid and/or a maleic acid anhydride with a hydrolyzed product of alkali metal in a reaction vessel.

To improve the calcium ion stability constant and property against iron particle deposition of the maleic acid copolymer, the process of preparing a maleic acid copolymer of the present invention is preferably performed under the condition a):

a) Maleic acid (salt) and water-soluble ethylenically unsaturated monomer (other monomer) are used in an amount with respect to the water-soluble ethylenically unsaturated monomer as another monomer component with a molar ratio in the range of from 90/10 to 10/90 (mole ratio), more preferably in the range of from 60/40 to 15/85, and most preferably in the range of from 40/60 to 20/80. When the ratio of these materials deviates from the described range of from 90/10 to 10/90, it is detrimental to the performances of the resulting maleic acid in view of the calcium ion stability constant and property against iron particle deposition.

Polymerization of the maleic acid copolymer of the present invention is preferably performed under the condition b):

b) At least 70 percent by weight of maleic acid (salts) used in the reaction is placed beforehand in the reaction vessel, i.e., before the reaction is started. In view of reducing the amount of the residual maleic acid (salts) upon completion of the polymerization reaction and improving the calcium ion stability constant of the polymer, it is preferable that at least 90 percent by weight of maleic acid (salts) is placed beforehand in the reaction vessel.

In view of improving the polymerizability, and the calcium ion stability constant of the maleic acid copolymer, it is preferable to perform a polymerization reaction under the condition c):

c): The concentration of the maleic acid (salts) at the start of the polymerization reaction is not less than 35 percent by weight. To still improve the above-mentioned properties, the concentration of the maleic acid (salts) when the polymerization starts is preferably not less than 45 percent by weight, more preferably not less than 60 percent by weight.

The water-soluble ethylenically unsaturated monomer used in the polymerization reaction of the present invention is not especially limited, and any ethylenically unsaturated monomer having solubility to water may be used. However, those listed earlier are preferably used in the copolymerization reaction. It is still more preferable that the solubility of the water-soluble ethylenically unsaturated monomer is not less than 5 g in 100 g of water at 100° C.

The polymerization reaction of the present invention is preferably performed under the condition d):

d) At least 70 percent by weight of water-soluble ethylenically unsaturated monomer is continuously introduced in the reaction vessel over a period in a range of from 30 to 500 minutes after the start of the copolymerization reaction. Less than 30 percent by weight of the unsaturated monomer may be placed in the reaction vessel beforehand. When placing not less than 30 percent by weight of water-soluble ethylenically unsaturated monomer, the distribution of the molecular weight of the resulting maleic acid copolymer is spread, and a block polymerized non-uniform copolymer is produced. Thus, such condition is detrimental to the calcium ion stability constant and also to the property against iron particle deposition.

It is preferable that the water-soluble ethylenically unsaturated monomer is introduced over a shorter period of time, because the distribution of the molecular weight of the resulting maleic acid copolymer becomes narrower, and the property against iron particle deposition can be improved. Besides, by introducing the monomer in a shorter period of time, an improved productivity can be achieved.

The copolymerization reaction is preferably performed under the condition e):

e) The water-soluble ethylenically unsaturated monomer is introduced over a time period in a range of from 30 to 180 minutes, and hydrogen peroxide, to be described later is introduced over a time shorter than the time required for introducing the water-soluble ethylenically unsaturated monomer, for example, a period in a range of from 20 to 170 minutes. The maleic acid copolymer obtained under the condition e) shows still improved property against iron particle deposition.

However, when introducing successively the water-soluble ethylenically unsaturated monomer over a time period of less than 30 minutes, the problem may occur as the amount of residual maleic acid upon completion of the polymerization reaction increases, or it may be difficult to desirably remove heat as a large amount of reaction heat is released in a short period of time.

In the process of manufacturing the maleic acid copolymer of the present invention, it is preferable to use both persulfate and hydrogen peroxide as a water-soluble polymerization initiator. The content of the hydrogen peroxide is preferably in the range of from 0.1 to 3.0 percent by weight based on the total monomers used in the process, more preferably not less than 0.3 percent by weight.

If the hydrogen peroxide is used in an amount of less than 0.1 percent by weight, the amount of residual maleic acid would increase, and the molecular weight of the resulting polymer would be too large, resulting in the maleic acid copolymer in undesirable color. On the other hand, if the hydrogen peroxide is used in an amount of more than 3.0 percent by weight, the property against iron particle deposition of the resulting maleic acid copolymer would be lowered, and the amount of residual hydrogen peroxide would increase, thereby presenting the problem of unsafe use. If the additional process of removing the residual hydrogen peroxide of the resulting maleic acid copolymer is performed, the greater number of steps are required to complete the manufacturing process, resulting in low productivity.

The hydrogen peroxide and the persulfate are preferably used with a weight ratio in the range of from $1/50$ to $1/2$, more preferably with a weight ratio in the range of from $1/20$ to $1/3$ in view of improving the property against iron particle deposition and calcium ion stability constant.

Examples of the other water-soluble polymerization initiator which can be used with hydrogen peroxide and persulfate include: persulfates such as ammonium persulfate, sodium persulfate, potassium persulfate, and the like; azo series compounds such as 2,2'-azobis (2 amidinopropane) hydrochloride; 4,4'-azobis-4-cyanovaleic acid, azobisisobutyronitrile, 2,2'-azobis-4-methoxy-2,4-dimethylvalenonitrile, and the like; organic peroxide such as benzoyl peroxide, lauroyl peroxide, peracetic acid; succinic peroxide, ditertiary butylperoxide, tertiary butyl hydroperoxide, cumin hydroperoxide, and the like. Only one kind of the above-listed water-soluble polymerization initiator which can be used with hydrogen peroxide and persulfate may be adopted, or two or more kinds thereof may be suitably mixed and adopted.

By carrying out the copolymerization reaction under the described conditions, the concentration of residual hydrogen peroxide upon completion of the polymerization reaction can be reduced to not more than 0.1 percent by weight with respect to the total amount of the reaction solution, more preferably not more than 0.05 percent by weight, still more preferably to not more than 0.02 percent by weight.

Additionally, under the above-mentioned copolymerization condition, the amount of the residual maleic acid upon completion of the polymerization can be reduced to not more than 3 percent by weight, more preferably not more than 0.3 percent by weight. If the content of the residual maleic acid exceeds 3 percent by weight, deposition of the maleic acid crystal may occur in cold areas in winter season.

The pH in the polymerization reaction can be selected at random. Additionally, it is permitted to adjust a pH during the polymerization reaction. Examples of neutralization-use basic compound for use in adjusting a pH during the polymerization reaction include: hydroxide compounds of alkali metal or carbonate such as sodium, potassium, lithium, and the like; ammonia; alkyl amine compounds such as monomethylamine, diethylamine, trimethylamine, monoethylamine, dimethylamine, triethylamine, and the like; alkanol amine compounds such as monoethanolamine, diethanolamine, triethanolamine, isopropanolamine, secondary butanolamine, and the like, pyridine and the like. Only one kind of the above-listed compound may be adopted, or two or more kinds thereof may be suitably mixed and adopted.

Furthermore, to achieve improved properties of the maleic acid copolymer in view of calcium ion stability constant, property against iron particle deposition, the content of the residual maleic acid upon completion of the polymerization reaction, and further to improve the reaction efficiency, it is preferable to satisfy the following two copolymerization conditions:

(Condition 1)

The pH value when the polymerization reaction is started is selected to be in a range of from 13 to 4, and the pH value is reduced as the reaction progresses.

(Condition 2)

For the polymerization initiator, persulfate is used as well as hydrogen peroxide with a ratio of hydrogen peroxide to persulfate of from 1/50 to 1/2.

The condition 1 is effective especially in view of property against iron particle deposition, while the condition 2 is effective especially in view of calcium ion stability constant.

Additionally, it is preferable to perform a polymerization reaction in a presence of polyvalent metal ion because the content of the residual maleic acid in the reaction solution upon completion of the polymerization reaction can be reduced, and also because the distribution of the molecular weight of the maleic acid copolymer can be reduced. Besides, the property against iron particle deposition can be improved. Examples of effective polyvalent metal compound include: an iron ion, a vanadium ion, a copper ion, and the like. For polyvalent metal ions, $Fe^{3+}$, $Fe^{2+}$, $Cu^{+}$, $Cu^{2+}$, $V^{2+}$, $V^{3+}$, $VO^{2+}$, etc., are preferable. Among these ions, $Fe^{3+}$, $Cu^{2+}$, $VO^{2+}$ and the like are more preferable. Only one kind of the above-listed compound may be adopted, or two or more kinds the reof may be suitably mixed and adopted.

The concentration of polyvalent metal compound is preferably in the range of from 0.1 to 100 ppm with respect to the total amount of the reaction solution. If the concentration is less than 0.1 ppm, the effect can be hardly achieved. On the other hand, when the density is more than 100 ppm, as the resulting maleic acid copolymer is deeply colored, the maleic acid copolymer may not be able to be used as a detergent composition.

For the polyvalent metal compound, any metal compounds and metals may be used in any form as long as they can be ionized in the polymerization reaction system. Examples of such metal compound include: water-soltble metal salts such as vanadium oxytrichloride, vanadium trichloride, vanadyl oxalate, vanadyl sulfate, anhydrous vanadic acid, ammonium methavanadic acid, ammonium hypovanadous sulfate $[(NH_4)_2SO_4 \cdot VSO_4 \cdot 6H_2O]$, ammonium vanadous sulfate $[(NH_4)V(SO_4)_2 \cdot 12H_2O]$, water-soluble metal salts such as cupric acetate(II), cupric bromide (II), copper(II), acetyl acetate, ammonium cupric copper(II) chloride, copper carbonate, copper(II) chloride, copper(II) citric acid, copper(II) formic acid, copper(II) hydroxide, copper sulfate, copper naphthenic acid, copper(II) oleic acid, copper maleic acid, phosphoric acid, copper(II) sulfate, copper(I) chloride, copper(I) cyanide, copper iodide, copper (I) oxide, copper (I) thiocyanate, iron acetyl acetonate, iron ammonium citrate, iron (II) ammonium oxalic acid, iron (II) ammonium sulfate, iron citrate, iron fuaric acid, iron maleic acid, iron (I) lactic acid, iron (II) nitric acid, iron penthacarbonyl, iron (II) phosphoric acid, iron (II) diphosphate, and the like; metal oxides such as vanadium pentoxide, copper(II) oxide, iron(I) oxide, iron(II) oxide, and the like; metal sulfides such as copper (II) sulfide, iron sulfide, and the like; or other copper powder, iron powder, and the like.

Among above-listed copolymers, those having narrow distribution in molecular weight of the copolymer and having a large amount of maleic acid introduced in a polymer portion are most preferable by more efficiently satisfying the conditions of the present invention.

It is preferable that the weight-average molecular weight of the maleic acid copolymer of the present invention is in the range of from 5,000 to 100,000. In view of calcium ion stability constant and property against iron particle deposition, it is more preferably in the range of from 20,000 to 80,000, and most preferably in the range of from 30,000 to 70,000.

The function of preventing the property against iron particle deposition of the maleic acid copolymer of the present invention can be determined by values measured by the following methods:

[Condition of Measuring the Property against Iron Particle Deposition]

Reaction Vessel: 500 ml beaker
Test Solution: A mixed solution of ①–③:
① 150 ml of 0.1 percent solution of iron(II) chloride hexahydrate;
② 150 ml of 0.1 percent solution of sodium hydroxide; and
③ 150 ml of 0.1 percent solution of maleic acid copolymer (based on solids). In ③, 150 ml of pure water without a copolymer was used as a blank.

Test method

Using a magnetic stirrer, the test solution was stirred for 5 minutes. Then, the resulting mixed solution was left at rest for two hours. Thereafter, the test solution was filtered off with 5C filter paper. After drying the filter paper, using SZ optical sensor (color measuring system) available from Nihon Dennsyoku Co., Ltd., the property against iron particle deposition was determined from the following formula based on L values measured in such a manner that the filter paper is pressed with a weight whose back surface is in black, and is covered by the black box.

[Formula]

property against iron particle deposition=L value (with the maleic acid copolymer)–L value (blank without copolymer).

The maleic acid copolymer of the present invention thus prepared shows the property against iron particle deposition of not less than 9.0. For the copolymer, the value of property against iron particle deposition is preferably not less than 11.0. In view of more effectively preventing the yellowish of the clothes, the property against iron particle deposition is most preferably selected to be not less than 13.0. If such property against iron particle deposition is selected to be not more than 9.0, the effect would be significantly reduced.

In the copolymer, the calcium ion stability constant indicates how strong the calcium ion in water is chelated, and the higher is the constant, the stronger is the ability of removing the muddy dust from fiber by removing calcium ions in water. The calcium ion stability constant of the maleic acid copolymer contained in detergent composition of the present invention is determined by a value (Log K) obtained by substituting the value under the below-mentioned conditions for measurement in the formula 1.:

① Preparing calcium ion solution having densities of 0.002 mol/L, 0.003 mol/L and 0.004 mol/L (using $CaCl_2$), and 50 g of the calcium ion solution thus prepared were placed into 100 cc beaker.
② 50 mg (based on solids) of maleic acid copolymer is added;

③ A pH is adjusted to be 10.
④ 0.15 g of NaCl is added as a calcium ion electrode stabilizer.
⑤ Using the calcium ion electrode, the density of the free calcium ion was measured.

Next, the formula 1 will be explained by respectively defining the parameters as follows:
Density of free calcium ion: [Ca]
fixed calcium ion density: [CaS]
free chelate site number: [S]
chelate cite number: [S0]
stability constant: Log K
Then, the formula [Ca][S]/[CaS]=1/K is obtained, and from this formula, [S]=[S0]−[CaS] can be obtained.
Thus, the formula 1 is given as:

$$[Ca]/[CaS]=1/[S0]\cdot[Ca]+1/[S0]\cdot K.$$

The respective values obtained from the formula 1 were plotted in the graph having [Ca]/[CaS] as a vertical axis and [Ca] as a horizontal axis. From the given tilt of the plot and the intercept, [S0], K, Log k were calculated.

The copolymer of the present invention has a calcium ion stability constant of not less than 4.5, and in view of improving the detergency, the calcium ion stability constant is more preferably in the range of from 4.7 to 7.0, and most preferably in the range of from 4.5 to 6.5. When the stability constant is too high, an metal ion in the enzyme may be removed when mixing an polymer with the enzyme, resulting in lower detergency.

The calcium ion capturing ability of the maleic acid copolymer contained in the detergent composition of the present invention is determined by the calcium ion (mg) captured by 1 g of polymer, based on calcium carbonate.

[Conditions of Measuring the Calcium Ion Capturing Ability]
Reaction Vessel: 100 ml beaker
Solution: 50 mg of $Ca^{2+}1.0\times10^{31\ 3}$ mol/1 solution
polymer: 10 mg (based on solids)
temperature: 25° C.
stirring time: 10 minutes (using a stirrer)

To the solution of calcium carbonate prepared by the above-mentioned conditions, was added a polymer with agitation under the above-mentioned conditions. The respective densities of the calcium ion in the solution of calcium carbonate before and after agitation were measured by a calcium electrode (93-20) available from Orion Co., Ltd using an ion analyzer (EA920) available from Orion Co., Ltd. Based on the difference between the densities before and after agitation, the amount of the calcium ion captured by the polymer was converted to calcium carbonate mg, and the resulting value was determined to be calcium ion capturing ability.

The calcium ion capturing ability of the copolymer is preferably not less than 300 mg $CaCO_3/g$ (based on calcium carbonate captured by 1 g of maleic acid copolymer), more preferably not less than 380 mg $CaCO_3/g$, and still more preferably not less than 400 mg $CaCO_3/g$. The higher is the calcium ion capturing ability, the more efficient is its performance as a detergent builder.

The gelation property of the maleic acid copolymer of the present invention is determined by the absorptivity obtained by the following manner:
[Conditions of Measuring Gelation]
Reaction Vessel: 500 ml tall beaker
Polymer: 40 ppm (based on solids) with respect to test solution
Test Solution: 400 g of $CaCl_2$ 400 ppm solution
Temperature: 50° C.
pH: 8
Measuring
Method: After agitating test solution for 5 minutes using a stirrer, the sampling was performed. Then, using a cell of 50 mm, absorptivity (ABS) with UV of 380 nm was measured using 50 mm cell.

In general, the polymer having high gelation properties is likely to be undissolvable in a washing solution. It has been found that especially when using water of high hardness, the washing ability is significantly lowered. In view of maintaining the excellent detergency of the maleic acid copolymer contained in the detergent composition in a stable condition, it is preferable to have low gelation properties, i.e., not more than 0.3.

The gelation properties suggest the values showing how easy the polymer deposits in a presence of calcium ion, and white turbidity when heating the polymer in the presence of the calcium ion was measured based on absorptivity of UV. Here, the greater is the value, the higher is the turbidity, indicating that a large amount of polymer deposited in the presence of calcium ion. In addition, a large amount of calcium ions are contained in city water, and washing always comes with the problem of gelation.

The character table for gelation properties are as shown below: Here, the smaller the value, the more effective as the detergent builder.

| character | gelation property |
| --- | --- |
| 0.1 or below | very low |
| above 0.1–0.3 | low |
| above 0.3–0.4 | high |
| above 0.4 | very high |

The detergent composition containing the detergent builder of the present invention may be used in combination with a surface active agent and, if an occasion demands, an enzyme.

For such surface active agent of the present invention, an anionic surface active agent, a nonionic surface active agent, a amphoteric surface active agent, and a cationic surface active agent may be preferably used.

Examples of the anionic surface active agent include: alkylbenzenephosphonic acid, alkyl or alkenyl ether sulfate, alkyl or alkenyl sulfate, α-olefin sulfate, α-sulfoaliphatic acid or ester salts, alkane sulfonic acid, saturated or unsaturated fatty acid salt, alkyl or alkenyl ether carboxylate, amino acid surface active agent, N-acylamino acid surface active agent, alkyl or alkenyl phosphoric acid ester or salts thereof.

Examples of the nonionic surface active agent include: polyoxy alkylenealkyl or alkenyl ether, polyoxyethylene alkylphenyl ether, higher aliphatic alkanolamide or alkylene oxide additives thereof, sucrose aliphatic ester, alkylglycoside, aliphatic glycerin monoester, alkylamine oxide, and the like.

Examples of the amphoteric surface active agent include: carboxylic or sulfobetaine amphoteric surface active agent, and the like. Examples of the cationic surface active agent includes: quaternary ammonium salts, and the like.

The ratio of use of the above-mentioned surface active agent is usually in the range of from 5 to 70 percent by weight, preferably in the range of from 20 to 60 percent by weight with respect to the total weight of detergent composition.

Examples of enzyme to be mixed in the detergent composition containing the detergent builder include: protease, lipase, cellulase, and the like. Especially, protease, alkalilipase, and alkalicellulase which show high activity in the alkali detergent are preferable. The content of the enzyme is preferably in the range of from 0.01 to 5 percent by weight with respect to the total weight of the detergent composition. If the content deviates from the range, the balance with the surface active agent would collapse, and the detergency of the detergent composition cannot be improved.

The detergent composition containing the detergent builder of the present invention may include: known alkali builder, chelate builder, anti-readhesion agent, fluorescent agent, bleaching agent, perfume, and the like when an occasion demands. In addition, zeolite may be added.

Examples of the alkali builder include: silicate, carbonate, sulfate, and the like. Examples of chelate builder include: diglycolic acid, oxycarboxylate, ethylenediamine tetraacetic acid (EDTA), ethylenetiamine hexaacetic acid (DTPA), citric acid, and the like, if an occasion demands.

According to the structure and the method of the present invention, the maleic acid copolymer is prepared by carrying out an aqueous solution copolymerization reaction between the maleic acid (salts) and another monomer such as a water-soluble ethylenically unsaturated monomer in the presence of the polymerization initiator, wherein hydrogen peroxide and persulfate are used as the polymerization initiator with a weight ratio in the range of from 1/50 to 1/2. The described method enables the content of the hydrogen peroxide as the polymerization initiator to reduce to the level of from 0.1 to 3.0 percent by weight with respect to the total weight of the copolymerization reaction solution.

The described copolymer enables the residual hydrogen peroxide in the reaction solution to be reduced to the permissible low level, and the copolymer having a large amount of carboxylic groups in a molecule can be obtained, thereby suppressing the residual maleic acid in the reaction solution.

According to the described method, the concentration of the hydrogen peroxide and the content of the residual maleic acid of the maleic acid copolymer obtained after being isolated from the copolymerization reaction solution can be significantly reduced. As a result, the concentration of the hydrogen peroxide upon the completion of the reaction can be reduced to not more than 0.05 percent by weight with respect to the total weight of the reaction solution, and the content of the residual maleic acid can be reduced to not more than 0.3 percent by weight with respect to the total weight of the reaction solution.

Moreover, in the described method, by reducing the time of introducing the water-soluble ethylenically unsaturated monomer to the level to an extent that an occurrence of a run-away reaction can be prevented, the copolymerization reaction can be performed with an improved efficiency. Furthermore, by mixing the polyvalent metal ion in the copolymerization reaction solution, the content of the residual maleic acid in the reaction solution can be still reduced, thereby improving the reaction efficiency.

When carrying out the copolymerization reaction, it is preferable to increase the ratio of the maleic acid (salts) to be placed and increase the density of the maleic acid (salt) upon starting the reaction, because such conditions offer a higher reactivity of the maleic acid (salts) upon starting the polymerization.

Additionally, when carrying out the copolymerization condition, by reducing the time of introducing the water-soluble ethylenically unsaturated monomer to the level to an extent that an occurrence of a run-away reaction would not occur, a narrower distribution of the molecular weight of the resulting maleic acid copolymer can be obtained. As a result, the property against iron particle deposition can be improved, while suppressing the gelation properties.

The described maleic acid copolymer of the present invention having specially defined calcium ion stability constant and property against iron particle deposition is effective especially as the detergent composition. Such high performance maleic acid copolymer can be obtained by adopting the polymerization method wherein the hydrogen peroxide and persulfate as the polymerization initiator are used in a particular amount with a specific ratio.

Although the exact reason why such high performance maleic acid copolymer is obtained is not known, it can be assumed that by uniformly introducing the maleic acid to the high-molecular portion of the polymer, the content of the residual low-molecular polymer can be reduced, and thus a polymer having narrow molecular weight distribution can be obtained.

As a result, the maleic acid copolymer of the present invention shows excellent properties in its calcium ion stability constant and property against iron particle deposition which are essential factors in strengthening the detergency of the detergent composition, and also show well-balanced properties. For the described beneficial properties, when adopting the detergent builder containing the copolymer of the present invention in the detergent composition, the detergent composition shows excellent performance.

To achieve the third object of the present invention, earnest researches have been made by the inventors of the present invention. As a result, they have succeeded in achieving a powdered detergent builder characterized by including a maleic acid copolymer which is a polycarboxylic acid or polycarboxylate copolymer having a molecular weight in the range of from 500 to 6,000,000 which shows high fluidity and high bulk density and very low hygroscopicity.

Namely, the detergent builder of the present invention is characterized in that the water-soluble polycarboxylic acid (carboxylate) is in a powdered form containing the surface active agent.

For the water-soluble polycarboxylic acid (carboxylate), it is preferable to have a molecular weight in the range of from 500 to 6,000,000, not less than 50 percent of a powdered portion having a particle diameter of 100–900 $\mu$m, not more than 10 percent of a powdered portion having a particle diameter of above 900 $\mu$m, not more than 40 percent of a powdered portion having a particle diameter of less than 100 $\mu$m, and a specific surface area of from 0.05 to 0.25 $m^2/g$ in view of improving bulk density and hygroscopicity.

Such detergent builder preferably satisfies the following conditions 1)–3).

1) angle of repose: not more than 60°;
2) bulk density: not less than 0.5 g/ml; and
3) hygroscopic degree: not more than 20 percent/day.

The angle of repose is a parameter of the fluidity, and if the angle of repose exceeds 60°, when supplying from a hopper, etc., the supply would not flow smoothly. For this reason, the angle of repose must be not more than 60°, preferably not more than 50°.

If the bulk density is less than 0.5 g/ml, the volume per weight of the powdered product becomes significantly large, and the transportation cost would be increased. Thus, such condition is unpreferable in consideration of transportation cost. Besides, when using such copolymer as the detergent composition, the bulk density would become greatly deviated from around 0.7 g/ml of the bulk density of the currently available powdered detergent, segregation or the like that may occur after mixing. Therefore, the bulk density is preferably not less than 0.5 g/ml, more preferably not less than 0.6 g/ml.

The molecular weight of the water-soluble polycarboxylic acid or carboxylate used as the detergent builder is required to be in the range from 500 to 6,000,000, and preferably in the range from 500 to 100,000.

When the absorbed amount of moisture after 24 hours has passed exceeds 20 percent by weight, it is unpreferable because the detergent composition becomes greasy, or becomes completely solid, thereby presenting the problem that the fluidity is greatly reduced. Therefore, the hygroscopicity is required to be not more than 20 percent by weight/day.

Furthermore, the content of the water-soluble polycarboxylic acid (polycarboxylate) in the detergent builder is preferably not less than 30 percent by weight, more preferably not less than 50 percent by weight, and most preferably not less than 70 percent by weight to achieve sufficient level of calcium ion capturing ability and the clay diffusivity, etc.

The detergent builder more preferably includes 0.1–20 percent of the surface active agent containing hydrocarbon having 5–20 carbon atoms. Namely, by adding the surface active agent having a hydrocarbon group of 5–20 carbon atoms as a hydrophobic group, the hygroscopicity can be reduced.

If the surface active agent includes a hydrocarbon group having less than 5 carbon atoms, as hydrophobic property is insufficient, the effect of reducing the absorbed amount of moisture would be small. On the other hand, if the surface active agent includes a hydrocarbon group having more than 20 carbon atoms, it is unpreferable because the hydrophobic property becomes too high on the contrary, which results in the problem that in its practical applications, the solubility to water becomes poor. Therefore, the number of carbon atoms is preferably in the range of from 5 to 20, and most preferably in a range of from 8 to 14 in view of a balance between hydrophobic property and hydrophilic property.

For such surface active agent of the present invention, generally used anionic surface active agents and nonionic surface active agents of from 5 to 20 carbon atoms may be used.

Examples of the anionic surface active agent include: alkylbenzene sulfonate, alkylsulfate, α-olefinsulfate, paraffin sulfate, alkylethoxy sulfate, and the like.

Examples of the nonionic surface active agent include: polyoxyethylenealkyl ether, polyoxyethylenealkyl phenyl ether, and the like. The anionic surface active agent is preferable, and among the anionic surface active agents, those having 8–14 carbon atoms are especially preferable.

If the content of the surface active agent is less than 0.1, sufficient effect cannot be achieved in view of reducing hygroscopicity. On the other hand, if the content of the surface active agent exceeds 20 percent, as the content of the polycarboxylic acid (salts) polymer is reduced, the properties the polycarboxylic acid (polycarboxylate) should have may not be ensured.

For the described reasons, the content of the surface active agent is preferably in the range of from 0.1 to 20 percent, and more preferably in the range of from 0.5 to 10 percent.

It is preferable that the detergent builder structures such that fine powders of the water-soluble polycarboxylic acid (salts) are bonded to each other by the surface active agent, more preferably structures such that the surface of the fine powders are covered by the surface active agent in view of improving bulk density and hygroscopicity.

The polymer of the water-soluble polycarboxylic acid (polycarboxylate) preferably satisfies the following conditions:

1) The calcium ion stability constant is not less than 4.0; and

2) The calcium ion capturing ability is not less than 300 mgCaCo3/g.

In considering the use of the detergent builder, the polymer contained in the detergent builder should have higher metal ion sealing function, and if the calcium ion stability constant is less than 4.0, and/or if the calcium ion capturing ability is less than 300 mg, the function cannot be fully exhibited. For the described reason, it is preferable that the calcium ion stability constant is not less than 4.5, and the calcium ion capturing ability is not less than 400 $mgCaCo_3$/g.

Additionally, it is more preferable that the polymer satisfy the following conditions:

3) The clay absorbability is in a range of from 30 to 70 percent; and

4) The clay diffusivity is not less than 1.2.

The clay absorbability and the clay difficivity are determined by values measured under the following conditions:

[Clay Absorbability]
Conditions of Measurements
Reaction Vessel: 100 ml measuring cylinder
Polymer solvent: 1 ml of 0.5 percent (based on solids) polymer solution+100 g of city water (Himeji City)
Clay: 1.0 g of Amazon clay
Stirring time: 10 minutes (magnetic stirrer)
Placement time: 18 hours
Measuring
Method: 10 ml is sampled from the top of the measuring cylinder, and after the supernatant is filtered off, the measurement is performed by gel permeation chromatography (GPC).

The same measurement was performed based on the values obtained from the described measurements without using clay, and the adsorption to the clay particles is computed from the following formula: Clay absorbability= [Area of Polymer Peak with Clay/Area of Polymer Peak without Clay]×100 (percent)

[Clay Diffusivity]
Conditions Measurements
Reaction Vessel: 100 ml measuring cylinder
Polymer solvent: 1 ml of 0.5 percent (converted to solid) polymer solution+100 g of city water (Himeji City)
Clay: 1.0 g Amazon clay
Stirring time: 10 minutes (magnetic stirrer)
Placement time: 18 hours
Measuring
Method: 10 ml is sampled from the top of the measuring cylinder, and the absorptivity coefficient (ABS) is measured at UV 380 nm using 1 cm cell, and the result is determined to indicate the clay diffusivity.

Another required condition for the polymer is that the diffusivity is high. If the clay absorbability is less than 30 percent, the clay granule cannot be charged to the anion. On the other hand, if the clay absorbability is above 70 percent, other functions of the polymer, such as metal ion sealing function would be lowered. Therefore, such conditions are industrially unpreferable. Also, if the clay diffusivity is less than 1.2, desirable diffusivity cannot be obtained, and thus it is unpreferable.

As long as the described performances are satisfied, any of the generally known water-soluble polycarboxylic acid (polycarboxylate) polymers may be used. However, acrylic acid (acrylate) copolymer and maleic acid (maleic acid salt) polymer are preferable, and a copolymer of acrylic acid (acrylate) and maleic acid (salt) is more preferable.

For the method of manufacturing the detergent builder, it is preferable to granulate with agitation the water soluble polycarboxylic acid (polycarboxylate) using a solution of the surface active agent as a binder. Namely, the solution of polycarboxylic acid (polycarboxylate) polymer is once dried into powders so as to have fine powders having low bulk density, poor fluidity and high hygroscopicity, and if an occasion demands, such fine powders further granule by an appropriate granular. Thereafter, the resulting powdered product is subject to the granulation process with agitation using the above-mentioned surface active agent as the binder by the agitated granulator.

The described method will be described in more detail.

Any of the following method can be adopted: the spray-drying process using a spray dryer, etc., a dry-powder process wherein a polymer solution is dried by making it adhere to a thin film on a rotatable drum or disk that is heated to high temperature, for example, by introducing steam in the inside; and the like. Among the described methods, the dry-powder process is especially preferable in view of drying efficiency, dry processing ability, and the like.

For the agitated granulator, generally used granulars of both horizontal type (for example, a high speed mixer available from Fukae Industrial Co. Ltd.) and vertical type (for example, Lödige mixer available from Lödige Co. Ltd.) may be used. However, it is preferable to adopt the vertical agitated granulator as it enables a shear to be exerted in a gravitation direction, and the bulk density to be increased without difficulties.

Next, the vertical agitated granulator will be explained. As shown in FIG. 1, the vertical agitated granulator includes a rotation shaft 2 which is horizontally placed in a cylindrical granulation vessel 1, and plural agitators 3 are provided in a direction of a diameter of the rotation axis so as to form the same angle at different positions in a direction of the rotation to each other.

At a leading end of each agitator 3, a shovel blade 4 is provided for granulating powered product introduced in the granulation vessel 1 by pressing to the inner wall 1a of the cylinder portion of the granulation vessel 1. The shovel blade 4 includes a main portion 4a and a pair of sub-portions 4b. The main portion 4a is composed of a substantially triangular plate extending from a front side to a rear side in the rotation direction A of the rotation shaft 2. The pair of sub portions 4b is composed of a plate extending from each side portion of the main portion 4 a against the rotation direction A to the rotation shaft 2. In this arrangement, as the rotation shaft 2 is horizontally placed, the shovel blade 4 rotates in a longitudinal (vertical) direction.

The main portion 4a faces the inner wall 1a of the cylinder portion that is curved in the granulation vessel 1, and it is set such that a distance from the inner wall 1a of the cylindrical portion becomes gradually smaller from the front portion to the rear portion of the main portion 4a. On the other hand, each sub portion 4b is projected from the surface of the main portion 4a to the inner wall 1a so that the height of the planes which face one another becomes gradually higher from the front portion to the rear portion of the main portion 4a.

On an inner wall 1a of the granulation vessel 1, a chopper (not shown) are provided and a nozzle (not shown). The chopper rotates for pulverizing a coarse particle, i.e., a lump is provided such that the rotation axis of the chopper is directed to the rotation shaft 2 from the inner wall 1a. The nozzle is provided for spraying a binder towards the chopper.

The described vertical agitated granulator may be equipped with a jacket cooler heater (not shown) for controlling a temperature of the granulation vessel 1 if an occasion demands.

The operation of the vertical agitated granulator will be explained below. First, powdered product is introduced into the granulation vessel 1, and the rotation shaft 2 is rotated such that the powdered product is fully agitated, for example, by rotating the rotation shaft 2 at the peripheral speed of the leading end portion of the shovel blade 4 of not less than 0.1 m/s, the powdered product is agitated by the shovel blade 4 and the agitator 3.

While rotating the chopper at higher speed than the rotation shaft 2, by successively spraying the binder towards the chopper in the granulation vessel 1 from the nozzle, the binder is uniformly dispersed by the chopper in the powdered product. The powered product having the sprayed binder while agitating the described manner forms a granule by agglomerating by adhesion by introducing the binder.

Such particles are compacted between the shovel blade 4 and the cylinder inner wall 1a, and the agglomeration of particles are further progressed by the binder bleeding on the surface of the particles due to compaction, and the fine particles are reduced, and the particles grow, thereby progressing the agitating granulation process.

In such agitating granulation process, a large particle remaining without being granulated, i.e., a clod if generated, is pulverized by a chopper, thereby progressing the granulation process by adjusting the particle size of particles in the granulation vessel 1.

In the vertical agitated granulator, by applying a shear (stress) on each particle by the shovel blade 4, the compaction and an improvement in specific gravity are enabled. On the other hand, in the horizontal agitated granulator, the rotation shaft 2 of the vertical agitated granulator is provided in a horizontal direction and a vertical direction.

In such vertical agitated granulator, when a shear (stress) is exerted onto each particle by a shovel blade 4, by the weight of each particle or powdered product, each granule and powder are more closely packed. Therefore, the vertical agitated granulator more effectively applies a shear (stress) to each particle than the horizontal agitated granulator, thereby improving a particle specific gravity of the powdered granular product.

The content of the detergent builder as the detergent composition is preferably in the range of from 0.1 to 20 percent. The detergent builder shows excellent metal ion sealing function and clay diffusivity. For these beneficial properties, by adding from 0.1 to 20 percent, more preferably from 1 to 10 percent, of the detergent builder to the detergent composition, the detergency of the detergent composition can be improved.

If the content of the detergent builder is less than 0.1 percent, a sufficient effect cannot be obtained. On the other hand, if the content of the detergent builder is above 20 percent, the contents of other mixing agents of the detergent composition become relatively small, and thus improved detergency cannot be obtained even if the content of the detergent composition is increased.

The detergent composition of the present invention including detergent builder may be combined with the surface active agent, enzyme, if an occasion demands.

For such surface active agent of the present invention, an anionic surface active agent, a nonionic surface active agent, an amphoteric surface active agent, and a cationic surface active agent may be preferably used.

The content of the surface active agent is preferably in the range of from 5 to 70 percent by weight, more preferably in the range of from 20 to 60 percent by weight.

Examples of enzyme to be mixed in the detergent composition containing the detergent builder include: protease, lipase, cellulase, and the like. Especially, protease, alkalilipase, alkalicellulase which show high activity in the alikai detergent are preferable. The content of the enzyme is preferably in a range of from 0.01 to 5 percent by weight. If the content deviates from the range, the balance with the surface active agent would collapse, and the detergency of the detergent composition cannot be improved.

The detergent composition containing the detergent builder of the present invention may include: known alkali builder, chelate builder, anti-readhesion agent, a fluorescent agent, a bleaching agent, perfume, and the like when an occasion demands.

PREFERRED EMBODIMENT OF THE PRESENT INVENTION

Figure 1:
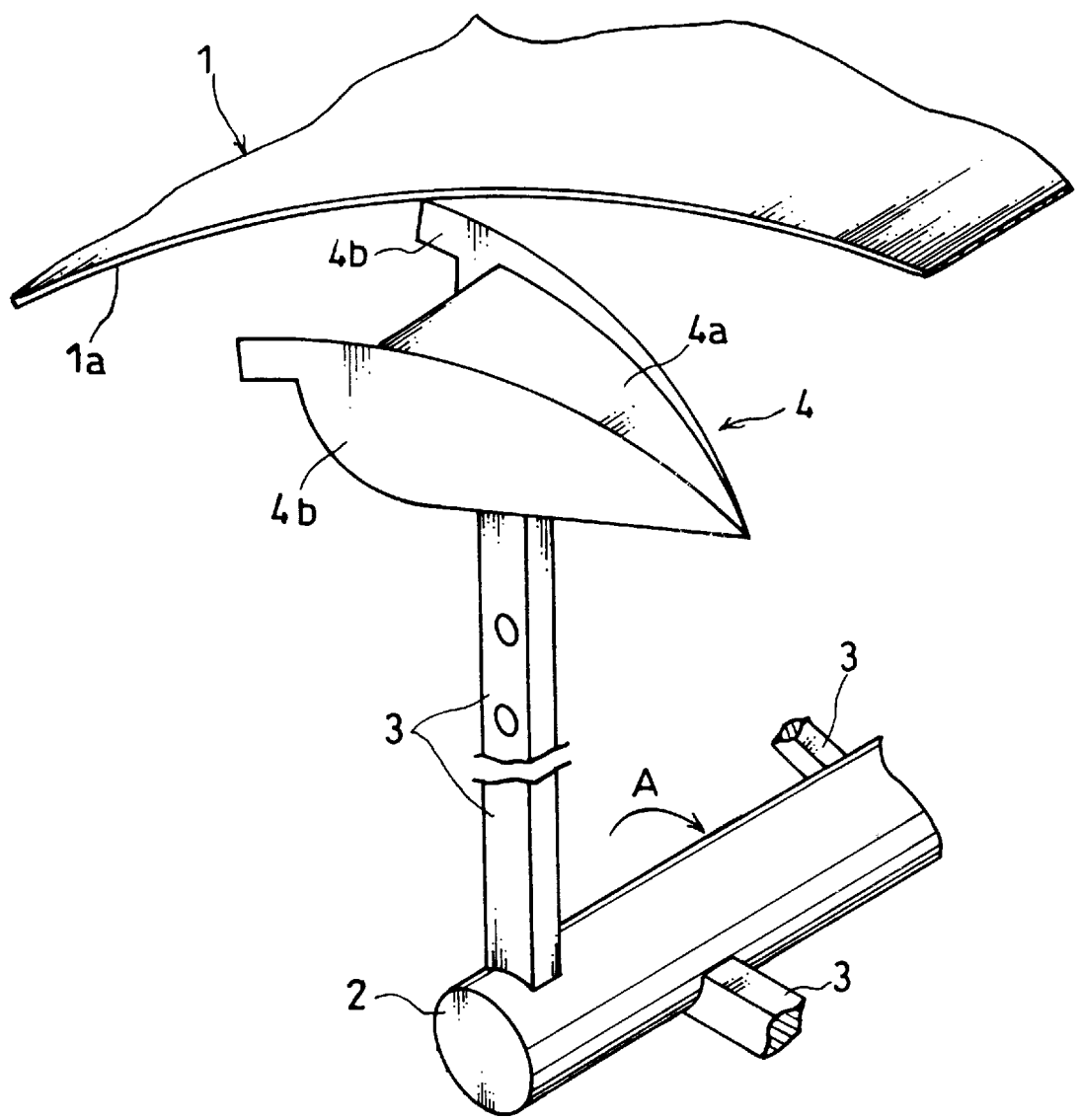
FIG. 1 is a perspective view of essential parts of a vertical agitated granulator used in a process of manufacturing a detergent builder of the present invention.

Hereinafter, the detergent builder and the method of manufacturing the detergent builder of the present invention are illustrated by the following examples of some preferred embodiments in comparison with comparative examples not according to the undermentioned examples. Furthermore, in the examples and comparative examples, the unit "percent" and "part(s)" respectively denote "percent by weight" and "part(s) by weight". In addition, "monomer" denotes "maleic acid (salt)".

EXAMPLE 1

In one-liter flask equipped with a thermometer, a stirrer, and a ref lux condenser were placed 196 parts of maleic acid anhydride (232 parts of maleic acid), 110.7 parts of deionized water, and 333.3 parts of 48 percent of sodium hydroxide solution. The mixed solution has density of 50 percent based on solid at a start of polymerization reaction and a pH value of 13. Then, the reaction mixture was heated to a boiling point with stirring under normal pressure.

Thereafter, with stirring, 200 parts of 10 percent sodium persulfate solution (3.52 percent by weight based on a monomer weight), dropped over 150 minutes, 6.65 parts of 35 percent hydrogen peroxide solution (0.41 percent by weight based on a monomer weight), dropped over 120 minutes and 560.78 parts of 60 percent acrylic acid solution (with molar ratio of maleic acid to acrylic acid of 3 to 7), dropped over 150 minutes are added in succession to complete a polymerization reaction. (At a start of polymerization reaction, the reaction solution has the monomer density of 50 percent and a pH of 5.) The described polymerization process conditions employed are shown in Table 1.

The determination of the weight-average molecular weight and the content of the residual maleic acid of the resulting maleic acid copolymer (1) was performed by gel permeation chromatography. The results are shown in Table 2. In the analysis, Asahi chemical Asahi pack GFA-7MF is used for a column, and 0.5 percent phosphoric acid solution was used for the elute. As a sample for the molecular weight standard, the polyacrylic soda standard sample (available from Sowa Kagaku Co. Ltd.) was used.

The performances of the detergent builder of the present invention, i.e., the property against iron particle deposition, the calcium ion stability constant, the calcium ion capturing ability, and the gelation properties were determined by the aforementioned methods. The color of the detergent builder was determined by the general method, and respective pH values from the start to the end of the polymerization reaction were determined by a commercially available pH meter. The results are shown in Table 2.

EXAMPLE 2

The same polymerization reaction as Example 1 was performed in the same manner except that 2.0 parts of 35 percent hydrogen peroxide (0.12 percent by weight basedon a monomer weight) and 300 parts of 10 percent sodium persulfate solution (5.28 percent by weight based on a monomer weight) were employed. The determination of properties of the resulting maleic acid copolymer was performed in the same manner as Example 1. The results are shown in Table 2 (At a start of polymerization reaction, the monomer density was 50 percent). The polymerization process conditions employed in this example are shown in Table 1.

TABLE 1

| Ex. | maleic acid copolymer (part) | among of use of water-soluble ehtylenically unsaturated monomer (B) | molar ratio of maleic acid (A)/(B) | initial 48% NaOH (part) (neutralization %) | 35% hydrogen peroxide (part) (C) | 10% sodium persulfate (part) (C) | hydrogen peroxide/persulfate (weight ratio) | polymerization pH |
|---|---|---|---|---|---|---|---|---|
| 1 | (1) | 60% (a) (560.78) | 3/7 | 333.3 (100%) | 6.65 (0.41) | 200 (3.52) | 1/8.6 | 13 → 5 |
| 2 | (2) | 60% (a) (560.78) | 3/7 | 333.3 (100%) | 2.0 (0.12) | 300 (5.28) | 1/44 | 13 → 5 |
| 3 | (3) | 60% (a) (560.78) | 3/7 | 333.3 (100%) | 32.5 (2.0) | 250 (4.4) | 1/2.2 | 13 → 5 |
| 4 | (4) | 60% (a) (360.50) | 3/7 | 333.3 (100%) | 6.65 (0.519) | 200 (4.46) | 1/8.6 | 13 → 5 |
| 5 | (5) | 60% (a) (1361.90) | 4/6 | 333.3 (100%) | 6.65 (0.22) | 200 (1.9) | 1/8.6 | 13 → 4 |
| 6 | (6) | 60% (a) (42.41) | 15/85 | 333.3 (100%) | 6.65 (0.90) | 200 (7.77) | 1/8.6 | 13 → 7 |
| 7 | (7) | 60% (a) (896.4) | 85/15 | 333.3 (100%) | 6.65 (0.367) | 200 (3.15) | 1/8.6 | 13 → 6 |
| 8 | (8) | (b) 20% aq. (5087.0) | 3/7 | 333.3 (100%) | 6.65 (0.186) | 200 (1.6) | 1/8.6 | 13 → 7 |
| 9 | (9) | (c) E05 additive (1428) | 3/7 | 333.3 (100%) | 6.65 (0.14) | 200 (1.2) | 1/8.6 | 13 → 10 |
| 10 | (10) | (d) E05 additive (1297) | 3/7 | 333.3 (100%) | 6.65 (0.152) | 200 (1.3) | 1/8.6 | 13 → 10 |
| 11 | (11) | glycerin monoallyl ether (616) | 3/7 | 333.3 (100%) | 6.65 (0.274) | 200 (2.36) | 1/8.6 | 13 → 10 |
| 12 | (12) | 30% sodium acrylic acid (1463.9) | 3/7 | 333.3 (100%) | 6.65 (0.374) | 200 (2.98) | 1/8.6 | 13 → 11 |

TABLE 1-continued

| Ex. | maleic acid copolymer | among of use of water-soluble ehtylenically unsaturated monomer (B) (part) | molar ratio of maleic acid (A)/(B) | initial 48% NaOH (part) (neutralization %) | 35% hydrogen peroxide (part) (C) | 10% sodium persulfate (part) (C) | hydrogen peroxide/persulfate (weight ratio) | polymerization pH |
|---|---|---|---|---|---|---|---|---|
| 13 | (13) | 60% acrylic acid solution (560.78) | 3/7 | 333.3 (100%) | 6.65 (0.41) | 200 (3.52) | 1/8.6 | 13 → 5 |

In Table 1, EO denotes ethylene oxide, and (C) denotes a monomer weight %. (a) denotes acrylic acid solution, (b) denotes 3-ariroxy-2-hydroxypropane sulfonic acid and Na salts, (c) denotes isoprenol, and (d) denotes aryllalcohol.

TABLE 2

| Ex. | maleic acid copolymer | molecular weight (×10³) | property against iron particle deposition | $Ca^{2+}$ stability constant | gelation properties | residual maleic acid (weight %) | residual $H_2O_2$ (weight %) | color (Hz) | $Ca^{2+}$ capturing ability (mg $CaCO_3$/g) |
|---|---|---|---|---|---|---|---|---|---|
| 1  | (1)  | 50 | 13.2 | 5.1 | 0.21 | 0.21 | 0.01 | 20 | 420 |
| 2  | (2)  | 50 | 12.5 | 4.5 | 0.22 | 0.23 | 0.00 | 35 | 410 |
| 3  | (3)  | 40 | 12.7 | 4.8 | 0.19 | 0.18 | 0.08 | 20 | 400 |
| 4  | (4)  | 30 | 12.4 | 4.7 | 0.20 | 0.09 | 0.01 | 25 | 400 |
| 5  | (5)  | 90 | 11.8 | 5.0 | 0.29 | 0.48 | 0.02 | 25 | 430 |
| 6  | (6)  | 13 | 12.1 | 4.7 | 0.25 | 0.07 | 0.01 | 30 | 400 |
| 7  | (7)  | 21 | 11.5 | 4.5 | 0.24 | 0.29 | 0.01 | 20 | 390 |
| 8  | (8)  | 22 | 11.8 | 4.5 | 0.13 | 1.25 | 0.01 | 60 | 385 |
| 9  | (9)  | 22 | 11.0 | 4.5 | 0.18 | 1.10 | 0.01 | 50 | 390 |
| 10 | (10) | 21 | 10.8 | 4.5 | 0.20 | 1.50 | 0.01 | 40 | 380 |
| 11 | (11) | 15 | 11.3 | 4.5 | 0.19 | 2.7  | 0.01 | 30 | 390 |
| 12 | (12) | 70 | 11.2 | 4.8 | 0.23 | 0.41 | 0.01 | 30 | 410 |
| 13 | (13) | 60 | 12.8 | 5.0 | 0.24 | 0.03 | 0.02 | 20 | 420 |

In Table 2, $Ca^{2+}$ denotes a calcium ion, and $H_2O_2$ denotes hydrogen peroxide.

EXAMPLE 3

The same polymerization reaction as Example 1 was performed in the same manner except that 32.5 parts of 35 percent hydrogen peroxide (2.0 percent by weight based on a monomer weight) and 250 parts of 10 percent sodium persulfate solution (4.4 percent by weight based on a monomer weight) were employed. The determination of properties of the resulting maleic acid copolymer was performed by the same manner as Example 1. The results are shown in Table 2. (At a start of polymerization reaction, the monomer density was 50 percent). The polymerization process conditions employed in this example are shown in Table 1.

EXAMPLES 4–6

The same polymerization reaction as Example 1 was performed in the same manner except that 60 percent acrylic acid solution was employed in an amount defined in Table 1 as the water-soluble ethylenically unsaturated monomer (B). The determination of properties of the resulting maleic acid copolymer was performed by the same manner as Example 1. The results are shown in Table 2. (At a start of polymerization reaction, the monomer density was 50 percent). The polymerization process conditions employed the examples are shown in Table 1.

EXAMPLES 7–12

The same polymerization reaction as Example 1 was performed in the same manner except that in replace of 60 percent acrylic acid solution, the water-soluble ethylenically unsaturated monomer (B) defined in Table 1 was employed. The determination of properties of the resulting maleic acid copolymer was performed by gel permeation chromatography. The results are shown in Table 2. (At a start of polymerization reaction, the monomer density was 50 percent). The polymerization process conditions employed in the examples are shown in Table 1.

EXAMPLE 13

The same polymerization reaction as Example 1 was performed in the same manner except that 0.04 parts of iron (II) ammonium sulfate hexahydrate was placed before the polymerization reaction started. The determination of properties of the resulting maleic acid copolymer was performed by the same manner as Example 1. The results are shown in Table 2. (At a start of polymerization reaction, the monomer density was 68.7 percent). The polymerization process conditions employed in the examples are shown in Table 1.

Comparative Examples 1–3 (Effects of the Polymerization Initiator)

The same polymerization reaction as Example 1 was performed in the same manner except that a solution of 35 percent hydrogen peroxide and 10 percent sodium persulfate solution were employed in an amount defined in Table 3. The determination of properties of the resulting maleic acid copolymer was performed by in the same manner as Example 1. The employed polymerization process conditions in the comparative examples are shown in Table 3. The results are shown in Table 4. (At the start of polymerization reaction, the monomer density was 50 percent).

Comparative Example 4

The same polymerization reaction as Example 1 was performed in the same manner except that 7760 parts of 60 percent acrylic acid solution was employed, and in the meantime, 5000 parts of deionized water and 200 parts of 10% sodium persulfate solution (0.41 percent by weight based on a monomer weight were added in succession over 150 minutes. The determination of properties of the resulting maleic acid copolymer was performed in the same manner as Example 1. The polymerization process conditions employed in the comparative examples are shown in Table 3. The results are shown in Table 4. (At the start of polymerization reaction, the monomer density was 50 percent).

process conditions of the comparative examples are shown in Table 3. The results are shown in Table 4. (At a start of polymerization reaction, the monomer density was 50 percent).

As clearly shown in Table 2 and Table 4, respective maleic acid copolymers of Examples 1–13 exhibit superior performances as the detergent builders of the present invention in view of their properties against iron particle deposition, calcium ion stability constant, gelation properties, amount of residual maleic acid, amount of residual hydrogen peroxide, color, calcium ion capturing

TABLE 3

| Comp Ex. | maleic acid copolymer | among of use of water-soluble ehtylenically unsaturated monomer (B) (part) | molar ratio of maleic acid (A)/ (B) | initial 48% NaOH (part) (neutraliz- ation %) | 35% hydrogen peroxide (part) (C) | 10% sodium persulfate (part) (C) | hydrogen peroxide/per- sulfate (weight ratio) |
|---|---|---|---|---|---|---|---|
| 1 | (1) | 60% acrylic acid solution (560.78) | 3/7 | 333.3 (100%) | 162 (10.0) | 568 (10.0) | 1/1 |
| 2 | (2) | 60% acrylic acid solution (560.78) | 3/7 | 333.3 (100%) | 3.33 (0.2) | 1740 (30.0) | 1/150 |
| 3 | (3) | 60% acrylic acid solution (560.78) | 3/7 | 333.3 (100%) | 0.81 (0.05) | 56.8 (1.0) | 1/20 |
| 4 | (4) | 60% acrylic acid solution (7760) | 7/93 | 333.3 (100%) | 6.65(0.048) | 200 (0.41) | 1/8.6 |
| 5 | (5) | 60% acrylic acid solution (42.41) | 85/15 | 333.3 (100%) | 6.65 (0.95) | 200 (8.19) | 1/8.6 |
| 6 | (6) | 60% acrylic acid solution (560.78) | 3/7 | 333.3 (100%) | 6.65(0.41) | 200 (3.52) | 1/8.6 |

In Table 3, (C) denotes a monomer weight %.

TABLE 4

| Comp Ex. | maleic acid copoly- mer | molecular weight ($\times 10^3$) | property against iron particle deposition | $Ca^{2+}$ stability constant | gelation properties | residual maleic acid (weight %) | residual $H_2O_2$ (weight %) | color (Hz) | $Ca^{2+}$ capturing ability (mg $CaCO_3$/g) |
|---|---|---|---|---|---|---|---|---|---|
| 1 | (1) | 8 | 7.8 | 4.4 | 0.35 | 0.10 | 2.5 | 50 | 340 |
| 2 | (2) | 7 | 6.3 | 4.3 | 0.36 | 0.25 | 0.01 | 200 | 320 |
| 3 | (3) | 150 | 7.5 | 4.3 | 0.50 | 2.8 | 0.00 | 250 | 380 |
| 4 | (4) | 200 | 7.1 | 4.3 | 0.90 | 0.55 | 0.01 | 40 | 390 |
| 5 | (5) | 1.8 | 4.1 | 3.9 | 0.25 | 13.5 | 0.02 | 110 | 220 |
| 6 | (6) | 80 | 8.0 | 4.2 | 0.33 | 0.15 | 0.01 | 120 | 370 |

In Table 4, $Ca^{2+}$ denotes a calcium ion, and $H_2O_2$ denotes hydrogen peroxide.

Comparative Example 5

The same polymerization reaction as Example 1 was performed in the same manner except that 60 percent acrylic acid solution was employed in an amount defined in Table 3. The determination of properties of the resulting maleic acid copolymer was performed by in the same manner as Example 1. The polymerization process conditions employed in comparative examples are shown in Table 3. The results are shown in Table 4. (The monomer density was 50 percent at the start of polymerization reaction).

Comparative Example 6

The same polymerization reaction as Example 1 was performed in the same manner except that 10 percent sodium persulfate solution, 35 percent hydrogen peroxide solution Find 60 percent acrylic acid solution were added respectively over 600 minutes. The determination of properties of the resulting maleic acid copolymer was performed in the same manner as Example 1. The polymerization ability as compared to respective comparative maleic acid copolymers of comparative examples 1–6. For the described beneficial properties, the detergent builders of the present invention are suited for use as the detergent compositions.

EXAMPLES 14–26

The detergent compositions of the present invention were prepared by adding respective maleic acid copolymers of Examples 1–13 as detergent compositions of examples 14–26 in accordance with a detergent composition shown in Table 5.

Next, the respective detergencies of the detergent compositions of Examples 14–26 were evaluated by the following method.

First, the artificial sludge defined in Table 6 was dispersed in carbon tetrachloride, and white cotton cloth was dipped into artificial sludge solution. Thereafter, the cloth was dried and cut into a piece of 10 cm×10 cm.

Using respective detergent compositions, the dirty cloth was washed under respective process conditions defined in Table 7. After being washed, the cloth was dried, and the reflectance thereof was measured. Based on the resulting reflectance, the detergency rate was computed by the below formula to determine the detergency of each detergent composition. The results are shown in Table 8.

Detergency Rate=(Reflectance after Washing–Reflectance before Washing)/(Reflectance of White Cloth after Washing–Reflectance of White Cloth before Washing)×100

TABLE 5

Detergent Composition

| Component | % by Weight |
| --- | --- |
| straight chain alkylbenzene sulfonic acid sodium (C = 11.5) | 20 |
| polyoxyethylene alkyl ether (C = 12, EO = 8) | 15 |
| zeolite | 20 |
| enzyme (protease) | 0.5 |
| maleic acid copolymer | 20 |
| sodium carbonate | 15 |
| No. 1 sodium silicate | 9.5 |

TABLE 6

Artificial Sludge

| Component | % by Weight |
| --- | --- |
| carbon black (defined by Oilchemical Association) | 0.5 |
| clay | 49.75 |
| myristic acid | 8.3 |
| oleic acid | 8.3 |
| stearic acid | 8.3 |
| trioleic acid | 8.3 |
| cholesterin | 4.38 |
| cholesterinestearate | 1.09 |
| paraffin wax (m.p. 50–52° C.) | 0.552 |
| squalene | 0.552 |

TABLE 7

Washing Condition

| temperature | 20° C. |
| --- | --- |
| bath ratio | 1/60 |
| detergent concentration | 0.5 percent |
| water | city water |
| Terg-O-Tometer | 10 minutes |

TABLE 8

Results of Detergency Rate

| Examples | maleic acid copolymer | detergency rate (percent) |
| --- | --- | --- |
| 14 | (1) | 96 |
| 15 | (2) | 95 |
| 16 | (3) | 94 |
| 17 | (4) | 94 |
| 18 | (5) | 93 |
| 19 | (6) | 93 |
| 20 | (7) | 94 |
| 21 | (8) | 92 |
| 22 | (9) | 91 |
| 23 | (10) | 92 |
| 24 | (11) | 93 |

TABLE 8-continued

Results of Detergency Rate

| Examples | maleic acid copolymer | detergency rate (percent) |
| --- | --- | --- |
| 25 | (12) | 94 |
| 26 | (13) | 95 |

Comparative Examples 7–12

With regard to comparative maleic acid copolymers (1)–(6), the respective detergency ratios were determined in the aforementioned manner. The results are shown in Table 9.

TABLE 9

Results of detergency Rate

| Comparative Examples | maleic acid copolymer | detergency rate (%) |
| --- | --- | --- |
| 7 | (1) | 75 |
| 8 | (2) | 65 |
| 9 | (3) | 70 |
| 10 | (4) | 65 |
| 11 | (5) | 60 |
| 12 | (6) | 80 |

As is clear from the results shown in Table 8 and Table 9, the detergent compositions containing the detergent builders of the present invention exhibit superior detergency ratios to the detergent builders of comparative examples 7–12 as respective above-mentioned properties are superior.

Next, the powdered detergent builders, the manufacturing process thereof and the detergent compositions containing such detergent builders will be explained with the below-mentioned concrete examples A–B. It should be noted here that, these examples are presented by way of description and are not to be considered as limiting the scope of this invention which is defined in the appended claims.

First, the process of preparing a copolymer solution of sodium acrylate/sodium maleate (molecular weight of 12000) as a polycarboxylic acid polymer which serves as a base material of the detergent builder will be explained.

In one-litter flask equipped with a thermometer, a stirrer, and a reflux condenser were placed 196 parts of maleic acid anhydride (232 parts of maleic acid), 110.7 parts of deionized water, and 333.3 g of 48 percent of sodium hydroxide solution (polymerization initial solid density: 50 percent). Then, the reaction mixture was heated to a boiling point with stirring under normal pressure.

Thereafter, with stirring, 75.5 parts of 35 percent hydrogen peroxide solution (8.26 percent by weight maleic acid (salts) (A)), dropped in succession over 60 minutes after the polymerization started, 309 parts of 60 percent acrylic acid solution, dropped in succession over 150 minutes after the polymerization started, and further 38.1 parts of 15 percent solution of sodium persulfate (3.52 percent by weight based on a monomer weight), dropped in succession from 60 minutes elapsed to 150 minutes elapsed after the polymerization started, were added to complete a polymerization reaction. The properties of the copolymers were determined in the aforementioned manner, and the below-mentioned results were obtained.

Calcium Ion Stability Constant (pKCa): 4.8
Calcium Ion Capturing Ability: 400 mgCaCO$_3$/g
Clay adsorbability: 50 percent
Clay diffusivity: 1.6

[Preparation of the Powdered Detergent Builder]

Next, the powdered detergent builders of the present invention will be explained based on respective detergent builders of the following Examples A and B prepared using the aforementioned polymer solution.

Example A

The polymer solution was dried using a CD dryer available from Nishimura Iron Co. Ltd., and ground to fine mesh by a feather mill available from Hosokawa Micron Co. Ltd. (screen 3 Φ). Then, the granulation with the below-mentioned surface active agent (25 percent solution of sodium alkyl benzene sulfonate) as a binder was carried out by a M-20-type Lödige mixer (vertical agitated granulator) under the below-listed conditions. The resulting powdered product was dried by leaving it at rest with no wind over 1 hour at 105°C. Then, the dried powdered product was passed through a sieve with a mesh of 1000 micron, thereby obtaining a sample A.
[Granulation Condition]
Placed Amount: 4.2 kg
Binder: solution of 25 percent sodium alkylbenzene sulfonate
Amount of Binder Added: 0.5 kg
Granulation Time: 20 minutes
Number of Rotations of Shovel: 240 rpm
Number of Rotations of Chopper: 6000 rpm Example B The polymer solution was dried using a CD dryer available from Nishimura Iron Co. Ltd., and ground to fine mesh by a hammermill available from Fujipowdal Micron Co. Ltd. (screen 1 Φ). Then, the granulation with the below-mentioned surface active agent (25 percent solution of alkyl benzene sulfonic acid soda) as a binder was carried out by a NSK-850S-type new speed mixer available from Okada Seiko Co., Ltd. (horizontal agitated granulator) under the below-listed conditions. In the same manner as Example A, the resulting powdered product was formed into a sample B.
[Granulation Condition]
Placed Amount: 500 g
Binder: solution of 25 percent sodium alkylbenzene sulfonate
Amount of Binder Added: 60 g
Granulation Time: 3 minutes
Number of Rotations of Agitator: 800 rpm
Number of Rotations of Chopper: 1100 rpm Comparative Example C The polymer solution was dried using a CD dryer available from Nishimura Iron Co. Ltd., and ground to fine mesh by a feathermill available from Hosokawa Micron Co. Ltd. (screen 3Φ). Then, the resulting powdered product, i.e., non-granulated product was used as a comparative sample C.

Comparative Example D

The polymer solution was dried using a CD dryer available from Nishimura Iron Co. Ltd., and ground to fine mesh by a feathermill available from Hosokawa Micron Co. Ltd. (screen 3Φ). Then, the granulation was carried out by a M-20-type Lödige mixer (vertical agitated granulator) under the below-listed conditions without using the surface active agent as a binder. In the same manner as Example A, the resulting powdered product was formed into a comparative sample D.
[Granulation Condition]
Placed Amount: 2.8 kg
Binder: 10 percent polymer solution
Amount of Binder Added: 0.2 kg
Granulation Time: 20 minutes
Number of Rotations of Shovel: 240 rpm
Number of Rotations of Chopper: 6000 rpm Comparative Example E The polymer solution was subject to the spray-drying process by a spray dryer equipped with No. 67 steam injector with an inner fluidized bed available from Annhydro Co., Ltd. The respective conditions for the drying process and the granulation condition are as listed below. The resulting powdered product was used as a comparative sample E. Without applying a post process, the comparative sample E had a water content and a grain size sufficient for comparing with respective samples of Examples A and B.
[Drying Condition]
Hot Air Temperature: 150° C.
Exhausted Air temperature: 85° C.
Raw Material Field Amount: 65 L/hr
[Granulation Condition]
Binder: 25 percent solution of sodium alkylbenzene sulfonate
Amount of Binder Added: 20 L/hr
Granulation Time: 20 minutes In the present specification, the distribution of particle diameter, the specific surface area, the angle of repose, and the absorbed amount of moisture (hygroscopicity) were measured in the following manner.
[Distribution of Particle Diameter]

First, the classification of Powders resulting from the granulation process was performed using JIS seive of 18 mesh (900 μm) and 150 mesh (100 μm), and a weight of a powder of each powder was measured.
[Specific Surface Area]

The specific surface area was measured by Kr gas adsorption process.
Measuring Instrument: Yuasa Ionics full automatic surface area measuring instrument 4-sorb
(Yuasa Ionics: type 2SU2 C)
[Measuring Conditions]
Drying Temperature: 200° C.
Drying time: 60 minutes
(Average of the results of 3 measurements)
[Bulk Density]

The bulk density (g/ml) was determined by powder weight (g)/powder volume (ml).
[Angle of Repose]

The angle of repose was measured by the injection method. This measurement was performed by the eye-estimation using a protractor.
[Absorbed Amount of Moisture]

To avoid the effect from the difference in grain size, about 1 g of powder resulting from the classification of the sieve with 850 micron and 180 micron was placed in a alminium open cup and was left for 24 hours in a room under normal temperature and normal humidity (temperature 23° C. and humidity 65 percent). Then, the amount of increase in weight of the powder was measured. Absorbed Amount of Moisture (percent)=(Weight after 24 hours–Initial Weight)/Initial Weight×100

[Results of Measurement]

The results of the measurement with regard to Examples A and B, and Comparative Examples C–E are shown in Table 10.

TABLE 10

| Sample | Example | | Comparative Example | | |
|---|---|---|---|---|---|
| | A | B | C | D | E |
| Particle Diameter (percent content) | | | | | |
| 100–900 μm | 75 | 65 | 35 | 45 | 28 |
| below 100 μm | 17 | 26 | 55 | 41 | 45 |
| above 900 μm | 8 | 9 | 10 | 14 | 27 |
| specific surface area | 0.18 | 0.17 | 0.28 | 0.26 | 0.35 |
| bulk density (g/cc) | 0.66 | 0.57 | 0.26 | 0.60 | 0.30 |
| angle of repose (degree) | 50 | 45 | 70 | 50 | 50 |
| absorbed amount of moisture (percent) | 17 | 19 | 26 | 24 | 21 |

As is clear from the results shown in Table 10, the sample of the comparative example C as the non-granulated product was inferior in all properties. For example, as the sample had low bulk density as compared to the average bulk density 0.7 (g/ml) of the detergent composition such as powdered detergent, and the like, the hygroscopicity thereof was high. Even in the mixed by drying form with the detergent composition such as the powdered detergent, etc., the segregation may occur during the transportation, thereby presenting the problem that such product becomes greasy by being absorbed while being stored, or becomes of uneasy use as being solidified.

As to the sample of comparative example E, although the angle of repose was improved by the fluid bed granulation, but the bulk density was not improved, thereby presenting the same problem such as segregation, etc., would occur. On the other hand, the bulk density was improved for the sample of comparative example D. However, as the surface active agent was not used in the granulation process as a binder, the hygroscopicity was not improved, and the sample was inferior in its handling as in the case of the above-mentioned comparative examples.

In contrast, the respective powdered detergent builders of Examples A and B have excellent properties of suppressing the deterioration of their detergency. Besides, these builders are superior to those of comparative samples in their specific surface area, bulk density, angle of repose and hygroscopicity, and have respective properties of sufficient levels for practical applications.

The described excellent properties of each detergent builder is obtained by such a structure that particles of the polycarboxylic acid polymer are bonded to each other by the surface active agent, and that the surface active agent is distributed to the surface of each particle so as to be covered by the surface active agent.

For the described structure, when mixing each builder to the detergent composition such as powdered detergent composition, etc., with a ratio of from 01 to 20 percent, more preferably in a range of from 1 to 10 percent, the drying mixing process can be adopted. Therefore, the detergent composition including the detergent builder can be manufactured at low cost.

According to the process of manufacturing the detergent builder of the present invention, by the granulation process with agitation with the surface active agent as a binder, the detergent builder having described excellent properties and characteristics can be manufactured at low cost.

With the process of manufacturing the detergent builder of the present invention, each powder of the polycarboxylic acid polymer can be granulated with compressive agitation, thereby manufacturing the detergent builder having excellent properties and characteristic under stable condition.

Possible Industrial Application

The detergent builder containing a maleic acid copolymer of the present invention has high calcium ion stability constant and property against iron particle deposition. For these beneficial properties, by applying it in a detergent composition, a detergent composition of significantly improved detergency by preventing the deterioration in detergency by calcium ion, the yellowish of fiber due to iron ion. Moreover, as such detergent builder also permits a ratio of residual maleic acid or hydrogen peroxide to be reduced, the maleic acid would not adversely affect the chelating function and diffusing function. As a result, the detergent composition containing the detergent builder can be effectively used especially as detergents for clothes. The powdered detergent builder of the present invention has desirable fluidity, high bulk density and very low hygroscopicity. For these beneficial properties, when mixing it into the detergent composition such as powdered detergent, etc., the dry-mixing process of the detergent composition can be performed easily under stable conditions. As a result, the detergent composition show improved fluidity of detergent composition, anti-caking property, and reduced segregation of each composition, thereby enabling high-quality detergent composition to be manufactured at low cost.

What is claimed is:

1. A detergent builder comprising:
   a maleic acid copolymer having a weight-average molecular weight in a range of from 5,000 to 100,000, wherein a molar ratio of maleic acid (salt) monomer to total monomers used in a process is in a range of from 0.1 to 0.9, said detergent builder having a property against iron particle deposition of not less than 9.0 and a calcium ion stability constant of not less than 4.5.

2. The detergent builder as set forth in claim 1, characterized in that:
   other monomers than said maleic acid (salt) monomer are ethylenically unsaturated monomers.

3. The detergent builder as set forth in claim 1, characterized in that:
   a calcium ion capturing ability is not less than 380 mg $CaCO_3$/g, and gelation property is not more than 0.3.

4. The detergent builder as set forth in claim 1, characterized in that:
   said weight-average molecular weight is in a range of from 20,000 to 80,000; and
   a molar ratio of said maleic acid (salt) monomer to total monomers used in the process is in a range of from 40/60 to 20/80.

5. A process of manufacturing a detergent builder, comprising the step of:
   carrying out a polymerization reaction of an essential monomer of maleic acid (salt) using a combination of hydrogen peroxide and persulfate as a polymerization initiator, wherein at least 70 percent by weight of a total of said maleic acid (salt) to be used is placed in a reaction vessel before carrying out said reaction.

6. The process of manufacturing a detergent builder as set forth in claim 5, characterized in that:

said polymerization reaction is performed with a molar ratio of a hydrogen peroxide monomer to total monomers used in the process in a range of from 0.1 to 3.0 percent by weight, and with a weight ratio of hydrogen peroxide to persulfate of from 1/50 to 1/2.

7. The process of manufacturing a detergent builder as set forth in claim 5, characterized in that:

said other monomers than said maleic acid (salt) monomer are ethylenically unsaturated monomers;

at least a part of said ethylenically unsaturated monomer and at least a part of said hydrogen peroxide are introduced in succession and polymerized; and an introducing time of said hydrogen peroxide is selected to be longer than an introducing time of said ethylenically unsaturated monomer.

8. The process of manufacturing a detergent builder as set forth in claim 5, characterized in that:

a pH value at a start of polymerization reaction is selected to be in a range of from 13 to 4, and the pH value is lowered as the polymerization reaction progresses.

9. A detergent composition including a detergent builder as set forth in any one of claims 1 through 4.

10. A powdered detergent builder, comprising:

a polymer of water-soluble polycarboxylic acid (salt) in a form of a fine powder; and a surface active agent containing a hydrocarbon group having 5–20 carbon atoms, said surface active agent bonding said fine powder together.

11. The powdered detergent builder as set forth in claim 10, characterized in that:

said polymer of water-soluble polycarboxylic acid (salt) has a molecular weight in a range of from 500 to 6,000,000, wherein a powdered portion having a particle diameter in a range of from 100 to 900 $\mu$m is not less than 50 percent, a powdered portion having a particle diameter above 900 $\mu$m is not more than 10 percent, a powdered portion having a particle diameter below 100 $\mu$m is not more than 40 percent, and a specific surface area is in a range of from 0.05 to 0.25 $m^2/g$.

12. The powdered detergent builder as set forth in claim 10, characterized in that:

said polymer of water-soluble polycarboxylic acid (salt) having a molecular weight in a range of from 500 to 6,000,000 includes a surface active agent which enables said polymer water-soluble polycarboxylic acid (salt) to have an angle of repose of not more than 60°, a bulk density of not less than 0.5 g/ml and a hygroscopicity rate of 20 percent/day.

13. The powdered detergent builder as set forth in claim 10, characterized in that:

a content of said surface active agent is in a range of from 0.1 to 20 percent by weight.

14. The powdered detergent builder as set forth in claim 10, characterized in that:

said surface active agent includes a hydrocarbon group of from 5 to 20 carbon atoms.

15. The powdered detergent builder as set forth in claim 10, characterized in that:

said polymer of water-soluble polycarboxylic acid (salt) has a calcium ion stability constant of not less than 4.0 and a calcium ion capturing ability of not less than 300 $mgCaCo_3/g$.

16. The powdered detergent builder as set forth in claim 15, characterized in that:

said polymer of water-soluble polycarboxylic acid (salt) has a clay adsorbability in a range of from 30 to 70 percent, and a clay diffusivity of not less than 1.2.

17. The powdered detergent builder as set forth in claim 10, characterized in that:

fine particles of said polymer of water-soluble polycarboxylic acid (salt) are bonded to each other by said surface active agent.

18. The powdered detergent builder as set forth in claim 10, characterized in that:

fine particles of said polymer of water-soluble polycarboxylic acid (salt) are covered by said surface active agent.

19. A powdered detergent builder as set forth in any one of claims 10–18, wherein:

said polymer of water-soluble polycarboxylic acid (salt) is a copolymer (salt) of acrylic acid and maleic acid.

20. A process of manufacturing a powdered detergent builder, characterized by comprising the step of:

carrying out a granulation process of powders including a copolymer of water-soluble polycarboxylic acid (salt) using a surface active agent as a binder.

21. The process of manufacturing a powdered detergent builder, as set forth in claim 17, characterized in that:

said granulation process is an agitating granulation process.

22. A detergent composition, including:

from 0.1 to 20 percent by weight of a detergent builder as set forth in any one of claims 10–16.

* * * * *